United States Patent Office 3,526,126
Patented Sept. 1, 1970

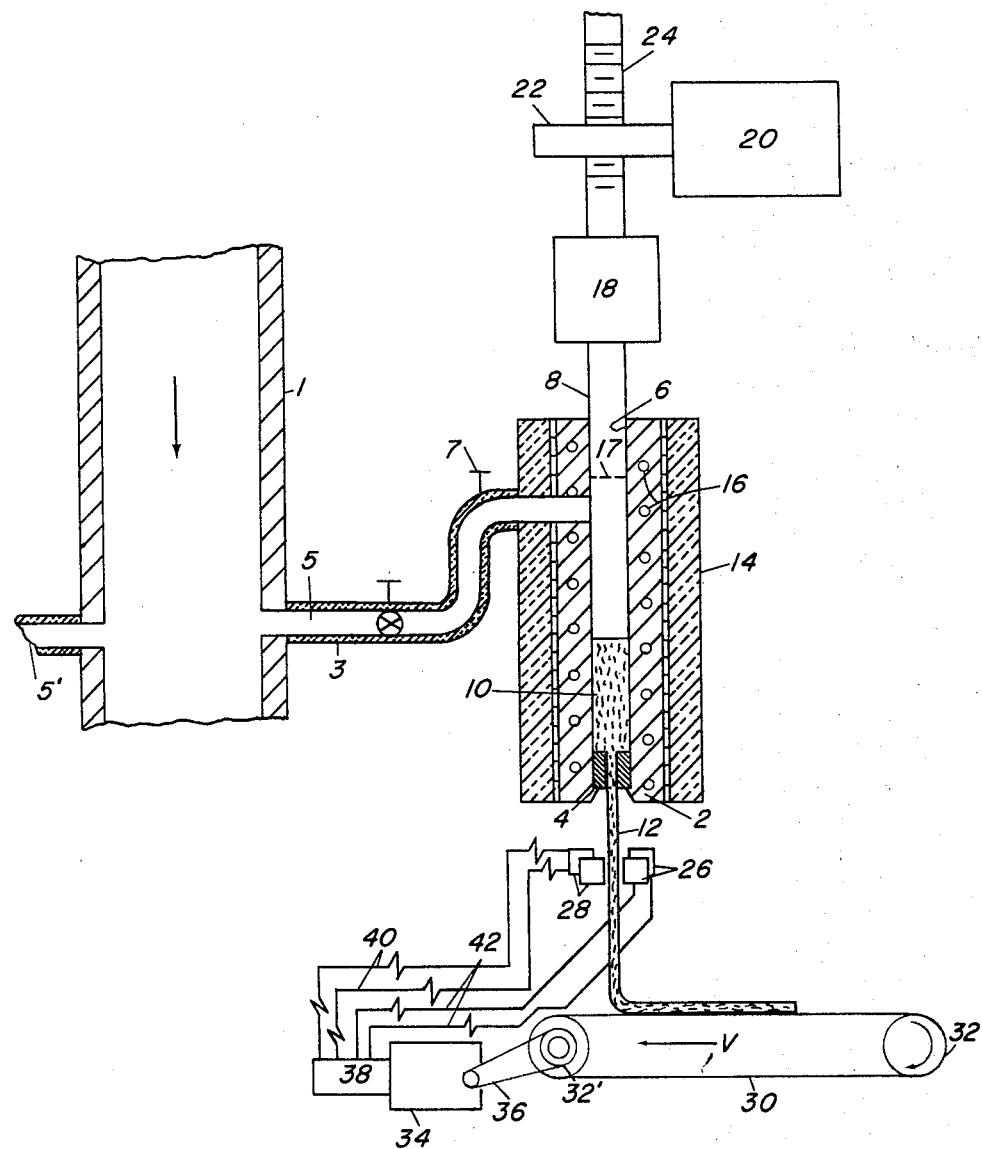

3,526,126
METHOD AND APPARATUS FOR DETERMINING THE MOLECULAR WEIGHT DISTRIBUTION OF POLYMERS
Zigmond W Wilchinsky, Westfield, and Edward N. Kresge, Watchung, N.J., assignors to Esso Research and Engineering Company, a corporation of Delaware
Filed Sept. 3, 1968, Ser. No. 756,985
Int. Cl. G01n 11/04
U.S. Cl. 73—56  9 Claims

ABSTRACT OF THE DISCLOSURE

The method of determining the molecular weight distribution of polymers which consists of extruding the polymer through a capillary die, measuring the cross-section or swell of the extrudate, and conveying the extrudate away from the die. The rate of conveying the extrudate away is varied in accordance with the measurement of the cross-section, and the variation in the rate of conveyance is related to the molecular weight distribution.

FIELD OF THE INVENTION

This invention relates to means and methods for characterizing a plastic material by determining its molecular weight distribution. More particularly, the invention relates to an apparatus and method of operating said apparatus whereby the molecular weight distribution and molecular weight of a polymer such as polyethylene, polypropylene, ethylene propylene copolymers, butyl rubber, and other elastomeric compounds may be quickly and accurately ascertained.

As is well known in the art, the molecular weight distribution of a polymer has pronounced affects on the rheological and, hence, processing properties of the polymer. Thus, there is considerable need to determine both the molecular weight distribution of polymers and their molecular average weights in order to provide effective plant control and consistent product quality. This is especially true in the case of certain elastomers such as butyl rubber, for example. Furthermore, as will be readily apparent, in today's large polymer and elastomer producing facilities, vast quantities of these materials are produced within short periods of time. It then becomes essential to determine as quickly as possible whether the material being made meets the desired product specifications.

In the past the measurement of molecular weight distribution has proven most difficult. In most cases it has taken several hours or even days to determine this property. In contrast, the apparatus and method of the instant disclosure are capable of ascertaining the molecular weight distribution and the molecular weight of a polymeric material within minutes after manufacture. As will be appreciated in light of the remarks heretofore, such rapid determination can effect great savings in manufacturing cost since the amount of any off specification materials will be reduced to a minimum.

The device of the instant disclosure is also advantageously used where several polymers are to be blended together to produce a material having a given molecular weight distribution for use in a particular process or for making a particular product.

Thus, the instant invention is directed towards providing a device and method of operating the device which enables one to characterize a polymeric material simply and efficiently.

SUMMARY OF THE INVENTION

The apparatus of the instant invention comprises an insulated heated block having a cylinder bore therein. At one end of the cylinder a die of known geometry is provided. Means are also provided for introducing the material under test into the cylinder. A piston or plunger is also provided for forcing the test polymer through the test die. Constant drive means apply force to the plunger so as to extrude the test material through the die. This force is ascertained by a load cell interposed between the drive means and the plunger. The drive means are adjustable so as to give a residence time in die of 0.5 to 2.0 minutes. Means are also provided for automatically determining the diameter of the test material after extrusion.

Using the above apparatus, the molecular weight distribution of the test polymer may be determined by measuring the swell of the extruded material leaving the die. This swell, which is defined as equal to the diameter of the extrudate minus the diameter of the die orifice over the diameter of the die orifice times 100, is used in conjunction with empirically developed formulas to obtain the value of molecular weight distribution. Thus, (1)
$$S = \frac{\text{diameter of extrugate minus diameter of orifice}}{\text{diameter of orifice}} \times 100$$

The following empirical relationship is then used to obtain the molecular weight distribution:

(2)  $\overline{M}_w/\overline{M}_n = 0.064S + 1.1$ where

S = percent swell in diameter of extrudate as defined by Equation 1,
$\overline{M}_w$ = weight average molecular weight, and
$\overline{M}_n$ = number average molecular weight.

As will be appreciated by those skilled in the art, $\overline{M}_w/\overline{M}_n$ defines a parameter commonly used as an index for the molecular weight distribution. It will usually be in the range of from about 3 to about 10 for most polymers being tested. Values of $\overline{M}_w/\overline{M}_n$ approaching 1 indicate narrow distributions, while those approaching 10 indicate broader spreads.

The value of S obtained from Equation 1 will usually be in the range of from about 40% to about 80%.

With regard to the determination of the $\overline{M}_w$ of the material being tested, use is made of the following:

By means of a load cell the force exerted during the extrusion of the test sample is measured.

Let $P_c$ = pressure drop between the entrance and exit ends of the extrusion die,
$P_e$ = die entrance pressure drop, and
$P_t$ = total pressure drop.

From rheological theory, the corrected shear stress $\tau_c$ is related to $P_c$ by Equation 3.

(3)  $$\tau_c = \frac{P_c}{4} \frac{D}{L} \text{ or } P_c = \frac{4\tau_c L}{D}$$

where

D = diameter of the die orifice, and
L = the length of the die.

By using two dies of the same diameter D but having differing lengths, $L_1$ and $L_2$ respectively, the following equations are obtained:

(4) $$P_{t_1}=(4/D)L_1\tau_c+P_e$$

(5) $$P_{t_2}=(4/D)L_2\tau_c+P_e$$

solving Equations 4 and 5 simultaneously to give (6) $$\tau_c = D/4 \left[\frac{P_{t_1}-P_{t_2}}{L_1-L_2}\right]$$

Since $P_t = F_t/A_p$ where $F_t$=force measured by the load cell, and
$A_p$=area of the plunger the following equation for $\tau_c$ is obtained:

(7) $$\tau_c = \frac{D}{4} \times \frac{1}{A_p}\left[\frac{F_{t_1}-F_{t_2}}{L_1-L_2}\right]$$

Using Equation 8 below, the shear rate is obtained.

(8) $$\dot{\gamma}=4Q/\pi r^3$$

where $\dot{\gamma}$=shear rate,
Q=volume of polymer extruded per second, and
r=radius of the die orifice.

Equation 9 relating viscosity, $\eta$, corrected shear stress, $\tau_c$, and the shear rate, $\dot{\gamma}$, is used to obtain the value of $\eta$.

(9) $$\eta = \tau_c/\dot{\gamma}$$

Finally, to obtain the desired measure of $\overline{M}_w$, use is made of Equation 10.

(10) $$\eta = AM^{3.5}$$

where

A=a constant,
M=a very close approximate of $\overline{M}_w$.

As will be readily appreciated, the computations referred to above may be made automatically and the results printed out by use of a suitable computer.

Thus, it is a specific object of the instant invention to provide a device and method of operating the device, which will determine the molecular weight distribution (MWD) and weight average molecular weight ($\overline{M}_w$) of a polymeric material.

Another object of the invention is to provide a device which is readily adaptable for continuous monitoring and which may be used in production as a fast and efficient tool for ascertaining whether the polymer being produced is within desired specification limits.

These and further objects as well as a fuller understanding of the invention may be had by reference to the accompanying detailed description and the drawing in which:

BRIEF DESCRIPTION OF THE DRAWING

The drawing illustrates a schematic representation of a preferred embodiment of the device of the instant invention.

DETAILED DESCRIPTION

Referring to the drawing in more detail, reference numeral 1 designates the conduit containing the material to be tested. This conduit may, for example, be the barrel of an extruder containing a polymeric material being extruded. Conduit 1 is provided with a valved sample take-off line 5. Sample take-off line 5 is provided with a suitable insulation layer 3 and a suitable temperature measuring element 7. The test device itself comprises a metallic body portion 2 provided with a cylindrical bore 6. Bore 6 is designed to receive a plunger or piston 8. Body member 2 is provided with a suitable temperature control system which may be in the form of a plurality of channels 16 adapted to receive a heat transfer fluid. This temperature control means insures that the temperature of the material under test, 10, is maintained at a desired constant level as it flows through the apparatus. The flow of heat transfer fluid through channels 16 may be automatically controlled through the use of suitable instrumentation (not shown). To help maintain a constant temperature, body member 2 is provided with a suitable insulation layer 14.

An extrudate die 4 is provided in the lower end of body member 2. This die in a preferred embodiment has an orifice with a diameter of 0.050 inch and a length of 0.315 inch. A constant drive unit comprising screw member 24, connecting means 22 and drive motor 20 is provided to drive plunger 8 at a constant rate so as to force the test material through the die orifice. In the preferred embodiment this unit is designed to give die residence times ranging from about 0.5 to about 2.0 minutes. A shear stress load cell 18 is provided at the end of screw member 24 to ascertain the shear stress developed as the material under test is pushed through the die orifice. In operation the apparatus works as follows:

At the start of the test, the bottom of plunger 8 is at a position as indicated by the dotted line 17. At this time the valved line 5 is open and a sample of the material to be tested is introduced into the cylindrical bore 6 in body member 2. The valve on line 5 is kept open for a predetermined time, which time is sufficient to allow all the material which was contained in line 5 to be purged through the die. After all the material has been so purged, an additional amount of sample, which is actually to be tested, is introduced into bore 6; and the valve on line 5 is then closed. Plunger 8 then begins its downward stroke and the material is extruded from the end of die 4.

If desired, the swelling of the extrudate can be determined by the use of suitable non-automated methods such as microscopic diameter measurement; however, in a preferred embodiment automatic means are provided for ascertaining the amount of extrudate swell. These means consist of the moving belt 30, pulleys 32 and 32' and associated regulating equipment. This associated equipment works as follows:

As the extrudate emerges from die 4, it passes between two sets of electronic eye means 28 and 26 before it falls onto belt 30, which is moving in the direction indicated by the arrow and traveling at a linear velocity equal to V. If the belt speed V increases, this will have tendency to pull the extrudate in-between the pair of electric eye means 26. This, in turn, will generate a signal via the signal lines 42 to a drive motor 38. Motor 38, which controls variable drive 34 and its associated belt 36, will be suitably slowed down so as to bring the linear velocity of travel of belt 30 back to a corrected value.

Similarly, if the velocity of belt 30 decreases, the extrudate will tend to cut between the pair of electric eyes designated as 28, which will in turn generate an appropriate signal via the lines 40, once again returning the belt to its desired velocity.

The following discussion will serve to explain how the belt and its associated equipment function to automatically establish the amount of swell as defined by Equation 1 hereinabove.

Let X=mass of material extruded per minute then

(11) $$X = \left(\frac{dl}{dt}\right) \times \frac{\pi D_o^2}{4} \times \rho_{t_o}$$

where $(dl/dt)$=the linear rate of extrusion through the die per minute,
$D_o$=diameter of the die, and
$\rho_{t_o}$=density of extrudate before swell also

(12) $$X = V \times \frac{\pi D^2}{4} \times \rho$$

where

V = linear velocity of the belt 30,
D = diameter of extrudate after swell, and
$\rho$ = density of the extrudate after swell.

Equations 11 and 12 give $$D^2 \times V \times \rho = D_o^2 \times \left(\frac{dl}{dt}\right) \times \rho_{to}$$

and $$\frac{D}{D_o} = \sqrt{\frac{\left(\frac{dl}{dt}\right)}{V} \frac{\rho_{to}}{\rho}}$$

or

(13)  $$\frac{D - D_o}{D_o}(100) = \frac{100K}{\sqrt{V}} - 100$$

where K is equal to a constant representing the value of the square root of $(dl/dt)$ $(\rho_{to}/\rho)$. This constant is determined by an initial measurement of $(dl/dt)$, $\rho_{to}$ and $\rho$.

It will be remembered that the left-hand side of Equation 13 is the amount of swell S as defined in Equation 1. Thus, by ascertaining the velocity V of belt 30, the amount of swell is readily determined. Here again suitable automatic readout and calculating means (not shown) may be employed to automatically determine the value of S.

Another take-off line 5', similar to 5, leads to another unit (not shown) similar to that in the figure but without the accessories for measuring swell. The die used in this second unit has the same diameter, i.e. 0.050 inch, as in the unit shown but is shorter, e.g. length of 0.025 inch. It is essential that the plunger be driven at the same speed in the two units. Furthermore, the two units are synchronized so that the charging and extruding operations occur in one unit at the same time as in the other.

From the force measured by the two load cells, the one on the unit not shown and the one designated by the reference numeral 18, the corrected shear stress $\tau_c$ is obtained by utilizing Equation 7 supra. Since the shear rate given by Equation 8 is constant, a value of the average molecular weight M may then be obtained from the shear rate and corrected shear stress by the application of Equations 9 and 10.

The following table compares results obtained using the device and methods of the instant invention with those obtained using conventional techniques. In the following table all the samples listed are butyl rubber. The Mooney number, obtained by a standardized procedure, is generally accepted in the rubber industry as index of the average molecular weight and the M avg. molecular weight values shown in the extreme right-hand column.

| Sample | Device and methods of instant invention | | Conventional methods and means | | |
|---|---|---|---|---|---|
| | $\overline{M}_w/\overline{M}_n$ | M avg. mol. wt. | $\overline{M}_w/\overline{M}_n$ | Mooney No. | M avg. mol. wt. |
| A | 6.4 | 651,000 | 6.4 | 71 | 640,000 |
| B | 5.8 | 632,000 | 5.7 | 71 | 640,000 |
| C | 3.7 | 362,000 | 3.6 | 28 | 360,000 |
| D | 5.5 | 560,000 | 6.3 | 44.5 | 555,000 |
| E | 3.6 | 586,000 | 3.3 | 55 | 585,000 |
| F | 4.6 | 592,000 | 4.5 | 61 | 605,000 |
| G | 2.8 | 567,000 | 3.7 | 48 | 565,000 |

As may be seen, the results obtained using the methods and device of the instant invention correlate very well with those obtained using conventional techniques. When, as previously discussed, it is remembered that these results are obtained in much shorter periods of time than heretofore possible, the merits of the instant invention are readily apparent.

While the device of the instant invention has been described in considerable detail, it should be understood that the specific structures herein illustrated and described are intended to be representative only, as certain changes may obviously be made therein without departing from the clear teachings of the disclosure. For example, the test device need not be directly connected to an extrusion barrel as illustrated in the figure. Also, as earlier indicated, other means and/or methods may be employed to ascertain the amount of extrudate swell.

In view of the above, reference should be had to the following appended claims in determining the full scope of the invention.

What is claimed is:

1. An apparatus for characterizing a polymeric material which comprises in combination a body portion defining a cylindrical bore having an entrance portion and an exit portion, means for introducing a sample of said polymeric material into said bore, a plunger disposed in said bore and adapted to force said polymeric material through said bore, a drive unit operatively associated with said plunger, said drive unit driving said plunger at a constant rate, a die disposed in said body portion and in communication with the exit portion of said bore, said die being of such size that said polymeric material has a die residence time ranging from about 0.5 to about 2 minutes when said plunger is driven at said constant rate, load cell means interposed between said drive unit and said plunger to ascertain the force said plunger exerts on said polymeric material and means for automatically determining the swell of said polymeric material after it exits from said die.

2. Apparatus according to claim 1 wherein said means for introducing a sample of said polymeric material into said bore is in communication with an extruder whereby material can be transferred from said extruder to said bore.

3. The apparatus of claim 1 wherein said means for automatically determining the swell of said polymer material comprises in combination of a movable belt disposed so as to receive the polymeric material exiting said die, a first pair and a second pair of electric eye means so positioned such that said material exiting said die normally passes between said first and said second electric eye means, and means responsive to electrical signals from said first and second electric means for adjusting the speed of said belt when said material exiting said die passes between either said first pair or said second pair of electric eye means.

4. Apparatus according to claim 1 further characterized in having a second body portion defining a cylindrical bore provided with a second die disposed therein, said die having the same diameter as said first die but having a different length, a second plunger disposed within said second bore, a second drive unit synchronized with said first drive unit for driving said plunger at the same rate as said first plunger and second load cell means interposed between said second drive unit and said second plunger.

5. The apparatus of claim 4 wherein the ratio of the length of said first die to the length of said second die is about 12.5 to 1.

6. The apparatus of claim 5 wherein said first die and said second die have diameters of about 0.05 inch.

7. An apparatus for measuring the molecular weight properties of polymers which comprises in combination:
   (a) means for extruding said polymer through a die;
   (b) means for measuring to determine the cross section of a polymer extrudate from said die;
   (c) means for conveying said extrudate;
   (d) means for varying the speed of said conveying means in response to signals from said measuring means.

8. A method of measuring the molecular weight properties of polymers which comprises in combination the steps of:
   (a) extruding a polymer through a die;
   (b) continuously measuring the cross-sectional diameter of the resulting extrudate;

(c) conveying said extrudate away from said die;
(d) varying the rate of conveyance of said extrudate in response to said measurements made of said cross-sectional diameter of said extrudate;
(e) utilizing said variation in rate to calculate said molecular weight properties.

9. A method according to claim 8 wherein said rate is varied in such manner as to achieve a uniform predetermined cross-sectional diameter of said extrudate.

References Cited

UNITED STATES PATENTS

| | | | |
|---|---|---|---|
| 3,203,225 | 8/1965 | Sieglaff et al. | 73—56 X |
| 3,209,581 | 10/1965 | Crane et al. | 73—56 X |
| 3,242,720 | 3/1966 | Zavasnik | 73—56 |
| 3,270,553 | 9/1966 | Ballman et al. | 73—56 |
| 3,360,986 | 1/1968 | Rothschild | 73—56 |

FOREIGN PATENTS

| | | |
|---|---|---|
| 148,267 | 6/1962 | U.S.S.R. |
| 1,261,692 | 2/1968 | Germany. |

LOUIS R. PRINCE, Primary Examiner.

J. W. ROSKOS, Assistant Examiner.